(12) United States Patent
Iwasa et al.

(10) Patent No.: US 6,198,578 B1
(45) Date of Patent: Mar. 6, 2001

(54) CAM FOLLOWER AND LENS BARREL

(75) Inventors: Kazuyuki Iwasa, Hino; Tamotsu Koiwai, Akiruno; Shinya Takahashi, Hino, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/421,825

(22) Filed: Oct. 20, 1999

(30) Foreign Application Priority Data

Oct. 23, 1998 (JP) .................................................. 10-302917
Oct. 23, 1998 (JP) .................................................. 10-302918

(51) Int. Cl.$^7$ .................................................. G02B 15/14
(52) U.S. Cl. ................................. 359/699; 359/694
(58) Field of Search ................................. 359/694, 699, 359/700, 701, 819, 823, 704

(56) References Cited

U.S. PATENT DOCUMENTS 4,707,083 * 11/1987 Iizuka et al. ........................ 359/700
5,721,645 * 2/1998 Iwasaki et al. ..................... 359/823

\* cited by examiner

*Primary Examiner*—Ricky Mack
(74) *Attorney, Agent, or Firm*—Ostrolenk, Faber, Gerb & Soffen, LLP

(57) ABSTRACT

In a lens barrel of the present invention, a M-cam frame is engaged with a rotary frame and movable frame so that the M-cam frame can rotate and advance or withdraw freely. A second group-of-lenses frame is engaged with the M-cam frame. A first cam follower is fixed to the M-cam frame with an edged shaft thereof press-fitted to the M-cam frame. A second cam follower having an edged slider surface is fixed to the second group-of-lenses frame. The slider surface of the first cam follower is engaged with a cam groove formed in the rotary frame so that the first cam follower can slide freely. The slider surface of the second cam follower is engaged with a cam groove formed in the M-cam frame so that the second cam follower can slide freely. The shaft of the first cam follower which is press-fitted will hardly come out owing to the edge thereof. Moreover, the second cam follower will hardly come off from the cam groove owing to the edge thereof.

34 Claims, 8 Drawing Sheets

CAM FOLLOWER AND LENS BARREL

BACKGROUND OF THE INVENTION

1. Field of the Invention

The present invention relates to the structure of a lens barrel having lens frames that are driven to advance or withdraw via cam followers.

2. Description of the Related Art

Conventional lens barrels have lens frames that can be advanced or withdrawn. A mechanism made by combining a cam groove and a cam follower is generally utilized for driving the cylindrical lens frames to advance or withdraw them. The cam groove runs obliquely to an optical axis, and the cam follower is engaged with the cam groove so that the cam follower can slide freely.

A structure enabling the whole slider surface of the cam follower to slide on a cam slide surface has been adopted as the structure of the cam follower that engages with the cam groove and slides thereon.

Moreover, a structure having the straight shaft of the cam follower press-fitted into a locking hole in a lens frame and thus having the cam follower to fixed to the lens frame has been adopted as the structure of the cam follower to be fixed to the lens frame.

In a conventional lens barrel to which the cam and cam follower is adapted, lens frames are small-sized in compliance with a recent demand for a compact and lightweight camera. Moreover, the lens frames tend to be thinner.

The lens frames themselves are therefore likely to deform. As far as the foregoing conventional structure enabling the cam follower to slide is concerned, when force is applied to the cam follower, the lens frame may be deformed and the cam and cam follower may be disengaged from each other.

Moreover, since the dimension of the shaft of the cam follower press-fitted into the lens frame is very small, if force is applied to the cam follower, there arises a fear that the press-fitted shaft may come off or become unstable. Moreover, using an adhesive to fix the shaft is unfavorable in terms of a manufacturing process or product management. Adhesives are therefore hardly used.

SUMMARY OF THE INVENTION

The present invention attempts to overcome the foregoing drawbacks. An object of the present invention is to provide a lens barrel having a frame advancing and withdrawing mechanism to which a cam follower is adapted, and capable of being smoothly driven to advance or withdraw. The lens barrel is characterized in that the portion of the cam follower engaged with the lens barrel will hardly come off, the cam follower fixed to a lens frame will hardly come out, and lens frames can be designed compactly.

According to one aspect of the present invention, there is provided a lens barrel having a first frame, a second frame, and a cam follower. The first frame has a cam groove cut therein. The second frame moves relative to the first frame. The cam follower has a slider surface that slides in contact with a cam surface of the cam groove, and has an edge formed on the slider surface. The shaft of the cam follower has a circumferential edge formed on the circumference of the shaft. The shaft is fitted into a hole bored in the second frame, whereby the cam follower is fixed to the second frame.

Moreover, according to another aspect of the present invention, there is provided a lens barrel having a first frame, and a second frame, and a cam follower. The first frame has a cam. The second frame moves relative to the first frame. The cam follower is fixed to the second frame, and has a slider surface that slides in contact with a cam surface of the cam groove, and a circumferential edge formed as a margin of the slider surface. The slider surface of the cam follower slides on the cam, whereby the second frame makes a relative movement.

Moreover, according to yet another aspect of the present invention, there is provided a lens barrel having one frame member, the other frame member, and a cam follower. The one frame member has a cam. The other frame member moves relative to the one frame member. The cam follower has a fitting shaft with which the cam follower is fitted in the other frame member, and a slider surface that slides on the cam. The cam follower has an edge formed on the circumferential surface of the shaft thereof. The shaft is press-fitted into a hole bored in the other frame member.

Other features of the present invention and advantages thereof will be fully apparent from the description below.

DESCRIPTION OF THE PREFERRED EMBODIMENT

An embodiment of the present invention will be described in conjunction with the drawings below.

Figure 1:
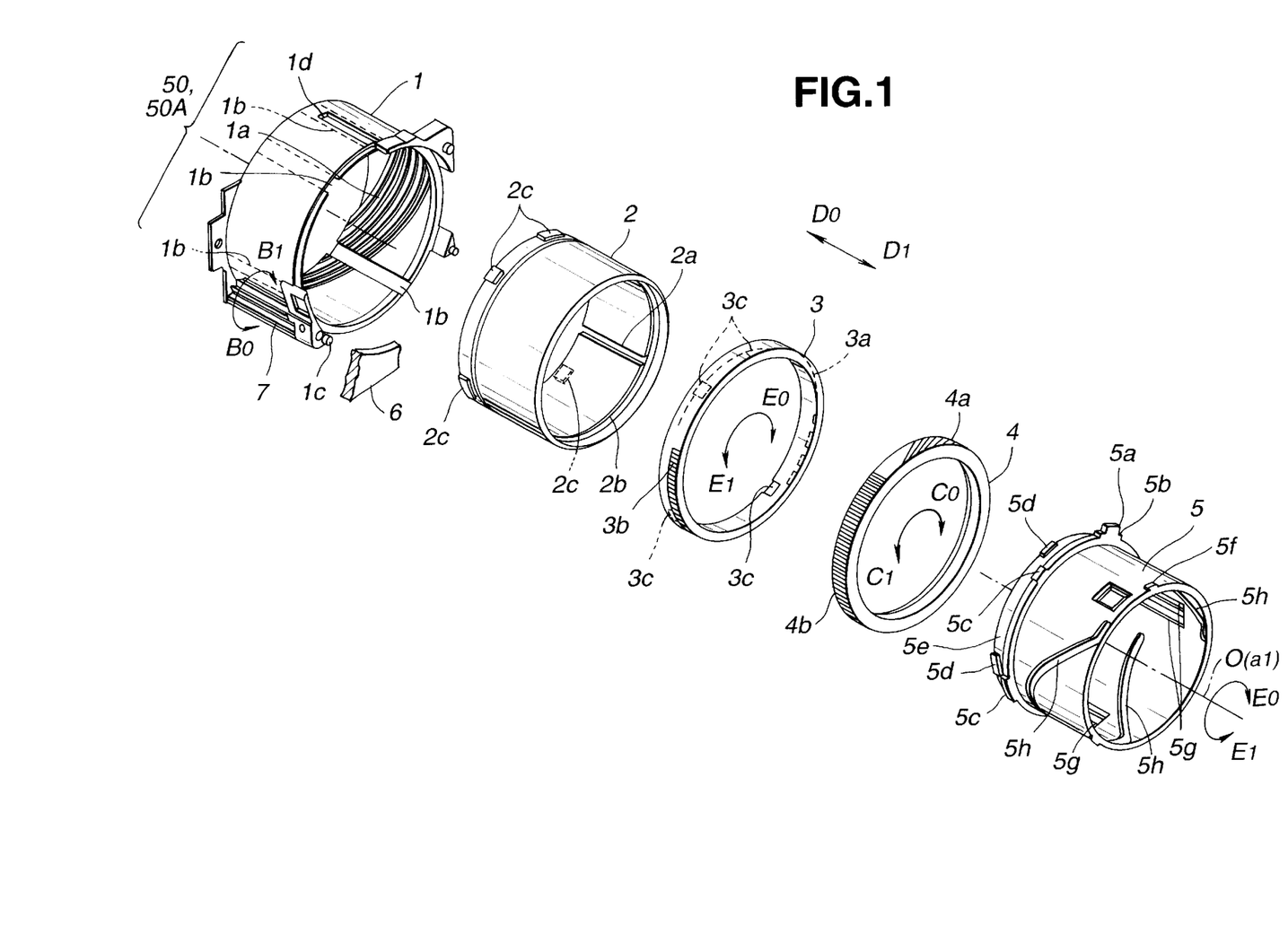
FIG. 1 is an exploded perspective view of a collapsing and driving system included in a lens barrel in accordance with one embodiment of the present invention.
Figure 2:
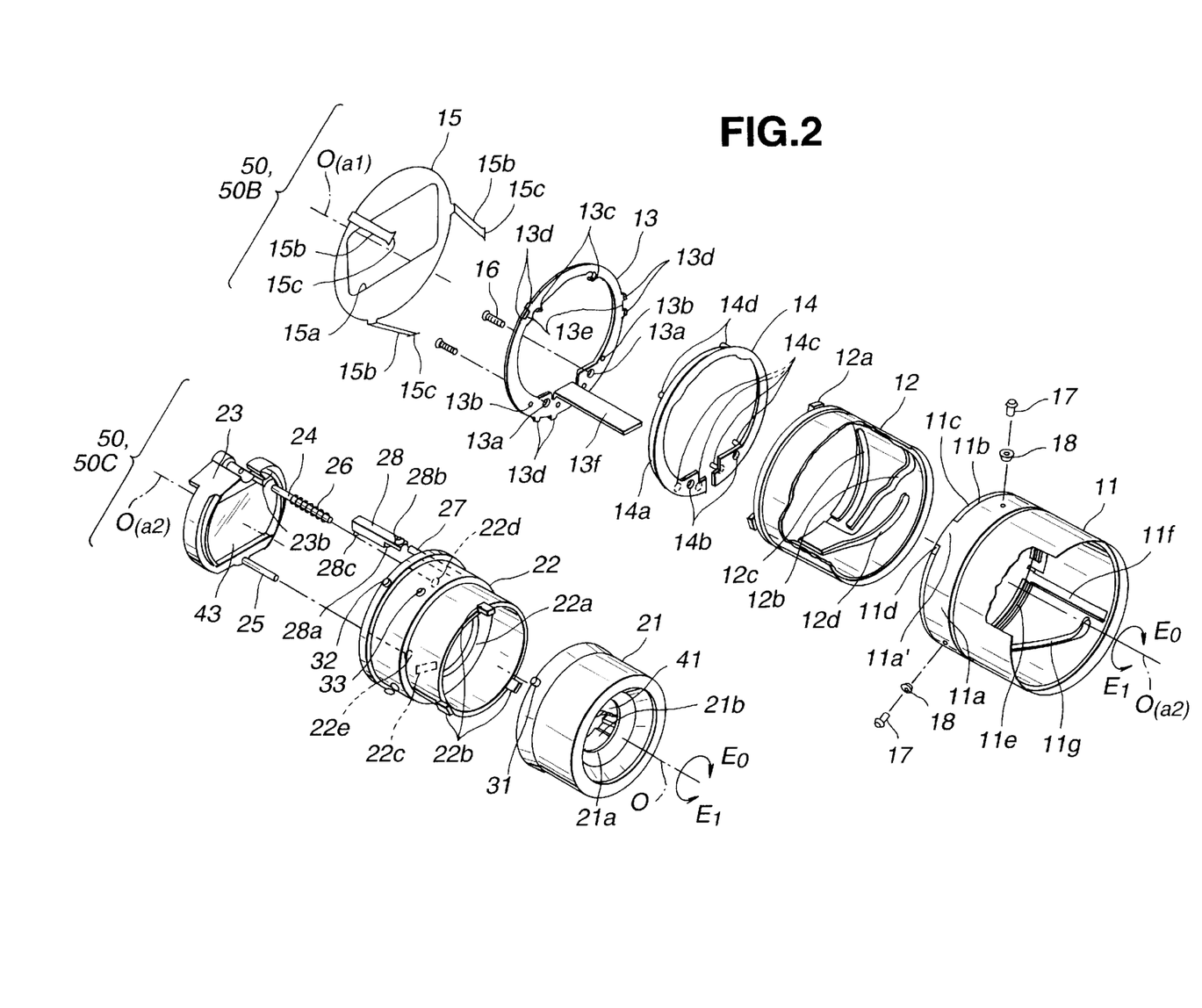
FIG. 2 is an exploded perspective view of a group-of-lenses driving system and a group-of-lenses frame unit included in the lens barrel in accordance with the embodiment.
Figure 3:
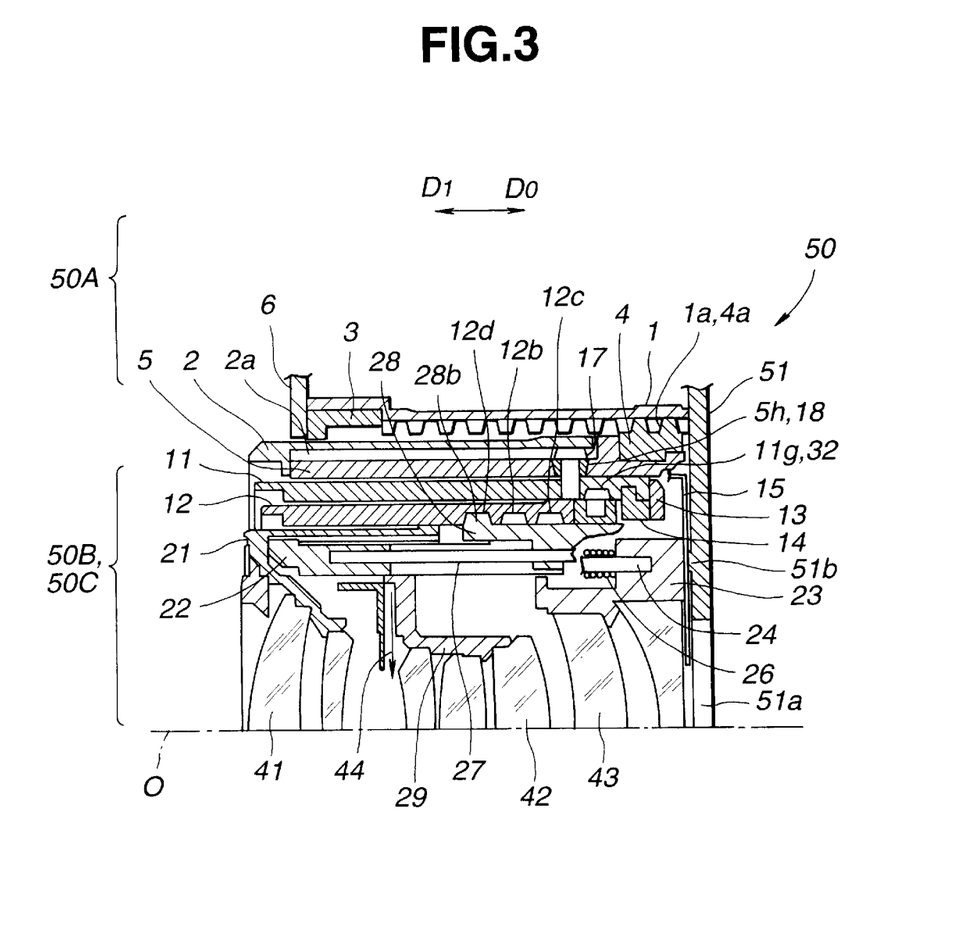
FIG. 3 is a longitudinal sectional view of the lens barrel in accordance with the embodiment, showing a collapsed state.
Figure 4:
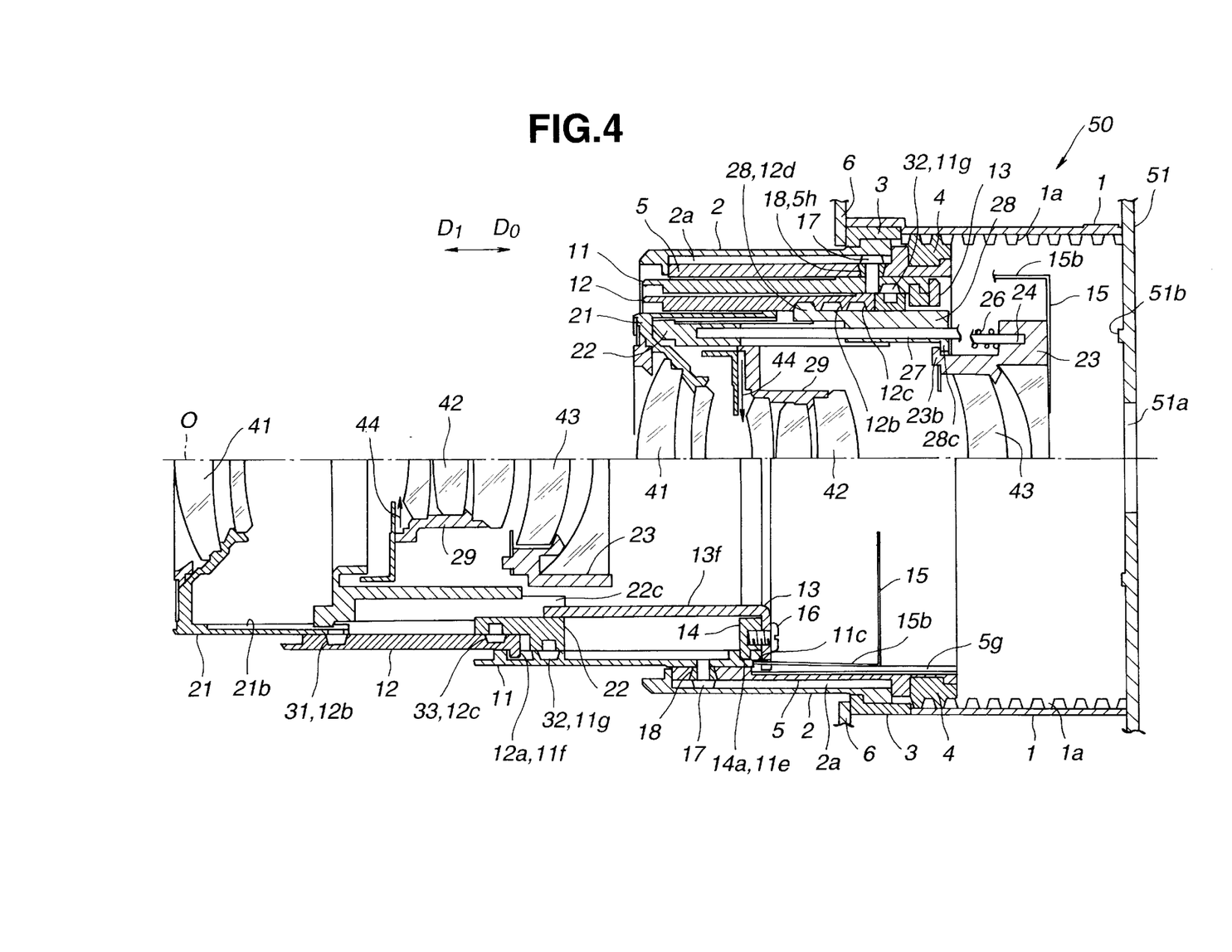
FIG. 4 is a longitudinal sectional view of the lens barrel in accordance with the embodiment, the upper half of FIG. 4 shows a ready-to-photograph state and wide-angle state, and the lower half thereof shows a telephoto state.

FIG. 1 and FIG. 2 are exploded perspective views of a lens barrel 50 in accordance with an embodiment of the present invention. FIG. 3 and FIG. 4 are longitudinal sectional views of the lens barrel 1 in different states. FIG. 3 shows a collapsed state. The upper half of FIG. 4 shows a ready-to-photograph state and wide-angle state, and the lower half thereof shows a telephoto state. Members in the exploded perspective views of FIG. 1 and FIG. 2 are not shown in a posture in which they are rotated when assembled. This is because the exploded perspective views are intended to clearly show the shapes of the members.

A lens barrel 50 consists of a collapsing and driving system 50A, a group-of-lenses driving system 50B, and a group-of-lenses frame unit 50C. The collapsing and driving system 50A drives lens frames to advance or withdraw between a collapsed position shown in FIG. 1 to a ready-to-photograph position, that is, over a collapsing and driving area. The group-of-lenses driving system 50B drives group-of-lenses frames shown in FIG. 2 to thrust them.

The collapsing and driving system 50A is, as shown in FIG. 1, composed of a stationary frame 1, a rotary frame 2, a helicoid ring 4, and a movable frame 5. The stationary frame 1 is fixed to and borne by a camera body, and includes a helicoid driving gear 7 and a driving ring 3. The rotary frame 2 is one frame member that advances or withdraws between the collapsed position and ready-to-photograph position, and rotates at the ready-to-photograph position between a wide-angle position to a telephoto position. The helicoid ring 4 is borne by the movable frame 5 so that the helicoid ring 4 can rotate freely. The movable frame 5 moves rectilinearly between the collapsed position and ready-to-photograph position together with the rotary frame 2.

The components of the collapsing and driving system 50A will be explained in detail. The stationary frame 1 is fixed to and borne by a camera body 51 (See FIG. 3). Rectilinear grooves 1d into which projections of the movable frame are inserted and which are through holes are bored in the outer circumference of the stationary frame 1. A helicoid female screw 1a and rectilinear grooves 1b are formed in the inner circumference thereof. Furthermore, the driving ring 3 is attached to a driving ring support 1c formed at the distal end of the stationary frame 1 so that the driving ring 3 can rotate. A reaction plate 6 restricts a position to which the driving ring 3 is thrust. Moreover, the helicoid driving gear 7 that is an elongated gear is formed on the outer circumference of the stationary frame 1 and extended in the axial directions. The helicoid driving gear 7 is borne by the driving ring support 1c so that it can be rotated. A teeth portion of the helicoid driving gear 7 is exposed to the interior of the stationary frame.

The rectilinear grooves 1b and rectilinear grooves to be described later are grooves bored parallel to the optical axis O of a photographic optical system.

The driving ring 3 has a zoom gear 3a and a viewfinder gear 3b formed on the outer circumference thereof. The zoom gear 3a is driven when engaged with a zoom driving system that is not shown. The viewfinder gear 3b is driven when engaged with a viewfinder driving system that is not shown. Notch-like concave parts 3c are formed in the inner circumference of the driving ring 3.

Rectilinear grooves 2a shaped like valleys are formed in the inner circumference of the rotary frame 2. An inner circumferential groove 2b is formed in the inner circumference thereof along the frontal edge thereof (on the side of an object). Projections 2c are formed on the outer circumference thereof. The rectilinear grooves 2a are shaped so that the width of each rectilinear groove gets larger towards the central optical axis. Tapered cam followers 17 fixed to a M-cam frame 11 to be described later are engaged with the rectilinear grooves 2a so that the cam followers can slide.

The helicoid ring 4 has a helicoid male screw 4a and a driving gear 4b formed on the outer circumference thereof.

The movable frame 5 has a strobe driving projection 5a, rectilinear guide projections 5b and 5c, projections 5d, a circumferential-direction guide 5e, and a projection 5f formed on the outer circumference thereof. The circumferential-direction guide 5e is formed among the projections 5c and 5b, an annular rib linking the projections 5c, and the projections 5d. The projection 5f is formed on the distal edge of the movable frame 5. Three sets of juxtaposed rectilinear grooves 5g are formed in the inner circumference of the movable frame 5. Furthermore, three cam grooves 5h each shaped like a valley are penetrating through the inner and outer circumferences of the movable frame 5. The cam grooves 5h each have an oblique groove portion tilting towards the optical axis O. The width of the oblique groove portion diminishes towards the central optical axis. Tapered cam followers 18 supported by the M-cam frame 11 to be described later are engaged with the cam grooves 5h so that they can slide (turn).

In the collapsing and driving system 50A having the foregoing members, the helicoid ring 4 is fitted to the circumferential-direction guide 5e of the movable frame 5, and retained with its position in the axial directions restricted so that it can rotate freely. Furthermore, the group-of-lenses driving system 50B and group-of-lenses frame unit 50C which will be described later are brought into contact with the inner circumference of the movable frame 5 so that they can freely rotate and advance or withdraw. The movable frame 5 is brought into contact with the inner circumference of the rotary frame 2. At this time, the projection 5f is engaged with the inner circumferential groove 2b. The movable frame 5 is supported by the rotary frame 2 with the position thereof in the axial directions restricted so that the movable frame 5 can rotate freely.

The rotary frame 2 and movable frame 5 are inserted into the stationary frame 1 with the projections 2c, 5c, and 5b fitted into the rectilinear grooves 1b and 1d so that the rotary frame and movable frame can make a rectilinear movement. At this time, the helicoid male screw 4a of the helicoid ring 4 is meshed with the helicoid female screw 1a of the stationary frame 1. The driving gear 4b is meshed with the helicoid ring driving gear 7.

Assume that the movable frame 5 and rotary frame 2 are located at a collapsed position on the side of a film surface (See FIG. 3) with the rotary frame 2 and movable frame 5 placed in the stationary frame 1. When the helicoid ring driving gear 7 is rotated clockwise B1 (when viewed from the side of an object), the helicoid ring 4 is rotated counterclockwise C1. With the rotation, the movable frame 5 and rotary frame 2 are thrust unitedly to a ready-to-photograph position in a direction D1 (on the side of an object) (See the upper half of FIG. 4).

At the ready-to-photograph position, the projections 2c of the rotary frame 2 are disengaged from the rectilinear grooves 1b and engaged with the concave parts 3c of the driving ring. In this state, when the driving ring 3 is driven to rotate in a direction E0 by means of a zoom driving system, the rotary frame 2 is rotated a bit from the ready-to-photograph position in the same direction and brought to a wide-angle position. When the rotary frame 2 is further rotated in the same direction, it is driven to a telephoto position that is a zooming position.

When the driving ring 3 is rotated in a direction E1 that is opposite to the above direction, the rotary frame 2 is rotated from the zooming position to the ready-to-photograph position. When the helicoid ring driving gear 7 is rotated in a direction B0 opposite to the above direction, the rotary frame 2 and movable frame 5 are plunged into the collapsed position.

Next, the group-of-lenses driving system 50B will be described.

The group-of-lenses driving system 50B consists, as shown in FIG. 2, of a M-cam frame 11, a F-cam frame 12, a key ring 13, and the movable flare diaphragm 15. The M-cam frame 11 that is a first frame (the other frame member) made of a resin is a frame member for bearing the movable flare diaphragm 15, and placed in the movable frame 5 and driven to advance or withdrawn and to rotate together with the rotary frame 2. The F-cam frame 12 is driven to rotate together with the M-cam frame 11 and to advance or withdrawn via a second group-of-lenses frame 22. A key presser 14 is fixed to the key ring 13 for guiding group-of-lenses frames rectilinearly. The movable flare diaphragm 15 that is a diaphragm member capable of moving rectilinearly is borne by the M-cam frame 11.

The members constituting the group-of-lenses driving system 50B will be explained in detail.

The M-cam frame 11 is a member brought into contact with the inner circumference of the movable frame 5 so that it can rotate and advance or withdraw. The M-cam frame 11 has an outer circumferential surface 11a, a stepped lateral surface 11b, a stepped circumferential surface 11c, an end outer circumferential surface 11a', and a circumferential-direction inclined surface 11d. The outer circumferential surface 11a serves as a slide surface on which distal convex parts 15c of the movable flare diaphragm slide. The stepped lateral surface 11b is a stepped portion. The end outer circumferential surface 11a' has a predetermined width. The circumferential-direction inclined surface lid adjoins circumferentially the stepped circumferential surface 11c.

The stepped circumferential surface 11c of the M-cam frame 11 is formed on the edge of the cam frame on the side of a film surface, and formed one step lower than the outer circumferential surface 11a. The stepped circumferential surface 11c serves as a slide surface on which the distal convex parts 15c of arms of the movable flare diaphragm 15 slide. The width in the axial directions of the stepped circumferential surface 11c is a bit larger than the width in the axial directions of the distal convex parts 15c so that the distal convex parts 15c can slide in circumferential directions. The end outer circumferential surface 11a' defines the same diameter as the outer circumferential surface 11a formed circumferentially inward of the stepped circumferential surface 11c. The end outer circumferential surface 11a' serves as a slide contact surface of a predetermined width with which the distal convex parts 15c of the movable flare diaphragm 15 comes into contact for sliding.

Moreover, an inner circumferential groove 11e is formed in the inner circumference of the M-cam frame 11 along the edge thereof on the side of a film surface. Three rectilinear grooves 11f, and three second group-of-lenses cam grooves 11g each having an oblique groove portion tilted towards the optical axis O are formed in the inner circumference of the M-cam frame 11.

Furthermore, three cam followers 17 each having a tapered slider surface that defines a diameter increasing towards the central optical axis are press-fitted and fixed to the outer circumference of the M-cam frame 11 with the shafts 17a thereof inserted thereto. Moreover, three cam followers 18 are meshed with the shafts 17a of the cam followers 17 so that they can rotate freely. The cam followers 18 each have a conical surface that defines a diameter diminishing towards the central optical axis. The cam followers 18 are engaged with the cam grooves 5h of the movable frame 5. The sliding portions of the cam followers 18 are engaged with the cam grooves 2a of the rotary frame 2.

Figure 5:
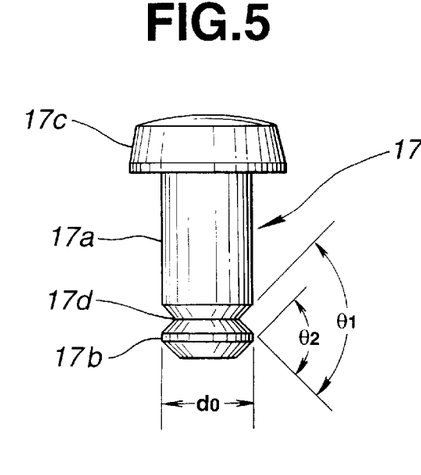
FIG. 5 is a front view of a cam follower to be fixed to a M-cam frame included in the lens barrel of the embodiment.
Figure 6:
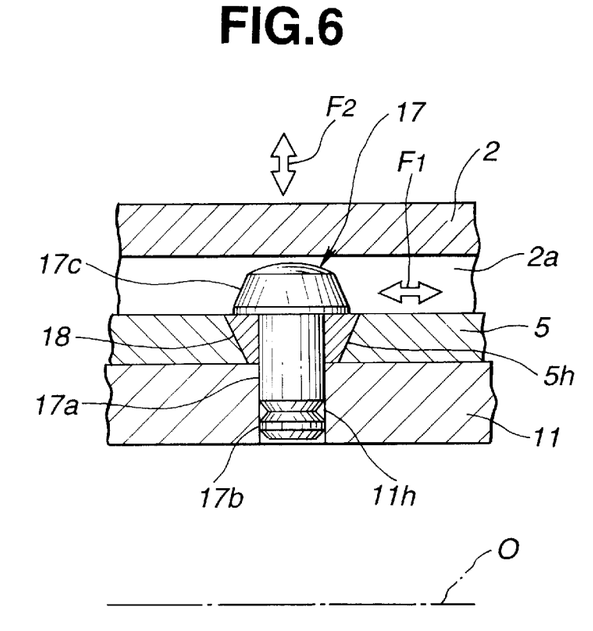
FIG. 6 is a longitudinal sectional view showing the cam follower, which is shown in FIG. 5, fixed to the M-cam frame and mounted in a rotary frame.

FIG. 5 is a front view of each cam follower 17 to be fixed to the M-cam frame 11, and FIG. 6 is a sectional view of the fixed cam follower 17.

The shape of the cam followers 17 will be described. Each cam follower has a slider contact surface 17c, the shaft 17a, and an edge 17b. The slider contact surface 17c is a conical surface defining a diameter that increases towards the shaft 17a (towards the optical axis O when the cam follower is fixed). The edge 17b is formed at the lower end of the shaft. The edge 17b defines the same diameter as the shaft 17a and has a surface thereof curved at an edge angle θ2 (90°). The edge 17b has a V-cut part 17d cut at a groove angle θ1 (90°) adjacently to the shaft 17a.

When the shaft 17a of any cam follower 17 is press-fitted into a shaft hole 11h of the M-cam frame 11 or when the cam follower is tilted after inserted into the shaft hole, the edge 17b of the cam follower is sunk into the shaft hole 11h. The slider surface 17c of the cam follower 17 and the cam follower 18 are pressed against the M-cam frame 11 through the cam groove of the movable frame 5. Even if forces F1 and F2 oriented in a direction along the optical axis O and a direction perpendicular to the optical axis O act on the shaft 17a (See FIG. 6), since the edge 17b is sunk in the shaft hole, the shaft 17a will not come out.

The F-cam frame 12 is a member engaged with the inner circumference of the M-cam frame 11 so that it can advance or withdraw. Three projections 12a are formed on the outer circumference of the F-cam frame 12. Three first group-of-lenses cam grooves 12b, three second group-of-lenses cam grooves 12c, and one third group-of-lenses cam groove 12d are formed in the inner circumference of the F-cam frame 12. The cam grooves each have an oblique groove portion tilting towards the optical axis O.

The movable flare diaphragm 15 is a very thin plate member and has an aperture 15a serving as a flare aperture stop formed in the center thereof. The movable flare diaphragm 15 has three arms 15b that extend slightly inward from directions parallel to the optical axis O when the diaphragm 15 is left free but not mounted on the M-cam frame 11. The three arms 15b can elastically deform and have the distal convex parts 15c formed circumferentially. When the movable flare diaphragm 15 is mounted on the M-cam frame 11, the arms 15b elastically deform and the distal convex parts 15c abut on the outer circumferential surface 11a or stepped circumferential surface 11c of the M-cam frame 11 with a predetermined constraining force.

The key ring 13 is a thin plate-like member for guiding the group-of-lenses frames rectilinearly. The key ring 13 has screw holes 13a, positioning holes 13b, three sets of juxtaposed projections 13d formed on the outer circumference of the key ring, concave parts 13e each formed between juxtaposed projections 13d, two notches 13c, and a rectilinear key 13f extending in the direction of the optical axis.

The key presser 14 is an annular member having part thereof cut and capable of elastically deforming. The key presser 14 has a brim 14a, two screw holes 14b, positioning pins 14c, and two presser pins 14d. The brim 14a is formed along the outer circumference of the key presser 14. The positioning pins 14c are formed by the sides of the screw holes 14b and fitted into the positioning holes 13b. The presser pins 14d have claw-like locking portions 14e.

In the group-of-lenses driving system 50B having the foregoing members, first, the F-cam frame 12 is engaged with the M-cam frame 11 with the projections 12a fitted in the rectilinear grooves 11f formed in the inner circumference of the M-cam frame 11. The group-of-lenses frames are placed in the assembly of the M-cam frame 11 and F-cam frame 12 so that the group-of-lenses frames can advance or withdraw freely.

The M-cam frame 11 having the group-of-lenses frames placed therein is brought into contact with the inner circumference of the movable frame 5 of the collapsing and driving system 50A so that the M-cam frame 11 can rotate freely. The cam followers 18 of the M-cam frame 11 are engaged with the cam grooves 5h so that the cam followers can slide freely. Furthermore, the cam followers 17 having the shafts 17a with which the cam followers 18 are meshed are passed through the movable frame 5 and engaged with the rectilinear grooves 2a of the rotary frame 2 so that the cam followers 17 can slide freely. The M-cam frame 11 is therefore rotated with the rotation of the rotary frame 2, and driven to advance or withdraw in the directions of the optical axis due to the cam grooves 5h of the movable frame 5.

The key presser 14 has the brim 14a thereof engaged with the inner circumferential groove 11e of the M-cam frame 11 while being extended in radial directions. The key ring 13 is attached to the key presser 14 with the positioning pins 14c fitted into the positioning holes 13b. The key ring 13 is secured using screws 16. The key ring 13 is therefore borne by the M-cam frame 11 with the position thereof in axial directions restricted by the end of the M-cam frame 11 on the side of a film, so that the key ring 13 can rotate freely.

The key ring 13 has the plurality of sets of juxtaposed projections 13d engaged with the plurality of sets of juxtaposed rectilinear grooves 5g of the movable frame 5 that advances or withdraws rectilinearly. The key ring 13 will therefore not be rotated but driven rectilinearly. Furthermore, the rectilinear key 13f of the key ring 13 is inserted into a rectilinear guide hole 22c of a second group-of-lenses frame 22, which will be described later, so that the rectilinear key can slide freely. The second group-of-lenses frame 22 and a first group-of-lenses frame 21 and third group-of-lenses frame 23 which are borne by the second group-of-lenses frame 22 are therefore guided rectilinearly.

The movable flare diaphragm 15 has the arms 15b thereof inserted to the concave parts 13e of the key ring from the side of a film surface. The movable flare diaphragm 15 is mounted so that the distal convex parts 15c can slide on the outer circumferential surface 11a of the M-cam frame 11 or the stepped circumferential surface 11c.

Next, the group-of-lenses frame unit 50C will be described below.

The group-of-lenses frame unit 50C consists of group-of-lenses holding frames that are placed in the M-cam frame 11 and F-cam frame 12 and moved rectilinearly. The group-of-lenses frame unit 50C consists of a first group-of-lenses frame 21, a second group-of-lenses frame 22, a movable follower 28, a third group-of-lenses frame 23, and a focusing frame 29 (See FIG. 3 and FIG. 4). The first group-of-lenses frame 21 holds a first group of lenses 41. The second group-of-lenses frame 22 that is a second frame is guided rectilinearly via the key ring 13 and driven to advance or withdraw by the M-cam frame 11. The movable follower 28 is driven to advance or withdraw via the F-cam frame 12. The third group-of-lenses frame 23 for holding a third group of lenses 43 is driven to advance or withdrawn via the movable follower 28. The focusing frame 29 holds a second group of lenses 42.

Three metallic cam followers 32 and three metallic cam followers 33 are fixed to the outer circumference of the second group-of-lenses frame 22. The second group-of-lenses frame 22 has three projections 22b formed on the distal edge thereof. The rectilinear guide hole 22c to which the rectilinear key 13f of the key ring is fitted, a shaft hole 22d formed along the optical axis O, a notch 22e, a guide shaft 27 fixed along the optical axis O. and an aperture in which a shutter 44 is locked are formed in the inner circumference of the second group-of-lenses frame 22.

The first group-of-lenses frame 21 holds the first group of lenses 41 in a hollow 21a thereof. The three cam followers 31 are formed on the outer circumference of the first group-of-lenses frame 21, and a rectilinear groove 21b is formed in the inner circumference thereof.

The movable follower 28 is a member for restricting a position to which the third group-of-lenses frame 23 is advanced or withdrawn. The movable follower 28 has a shaft hole 28a to which the guide shaft 27 of the second group-of-lenses frame 22 is fitted so that the guide shaft 27 can slide freely, a cam follower 28b, and a locking claw 28c used to lock the third group-of-lenses frame 23.

The third group-of-lenses frame 23 is a member borne by the second group-of-lenses frame 22 so that it can slide freely in rectilinear directions. The third group-of-lenses frame 23 has guide shafts 24 and 25 fixed thereto, and a locked portion 23b to which the locking claw 28c of the movable follower is fitted. The third group of lenses 43 is held in a hollow of the third group-of-lenses frame 23.

The focusing frame 29 holds a second group of lenses 42, is borne by the second group-of-lenses frame 22 so that it can advance or withdraw, and is driven to advance or withdraw by a focusing driving system that is not shown (See FIG. 3 and FIG. 4).

Now, a description will be made of the cam followers 32 fixed to the outer circumference of the second group-of-lenses frame 22, the shape of the cam grooves 11g of the M-cam frame 11 with which the cam followers 32 are engaged so that they can slide freely, and the sliding movement.

Figure 7:
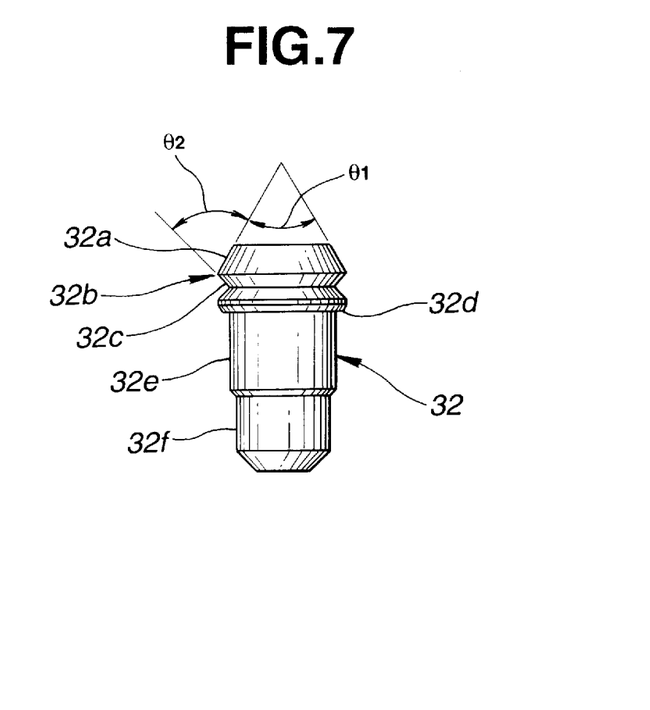
FIG. 7 is a front view of a cam follower to be fixed to a second group-of-lenses frame included in the lens barrel of the embodiment.
Figure 8:
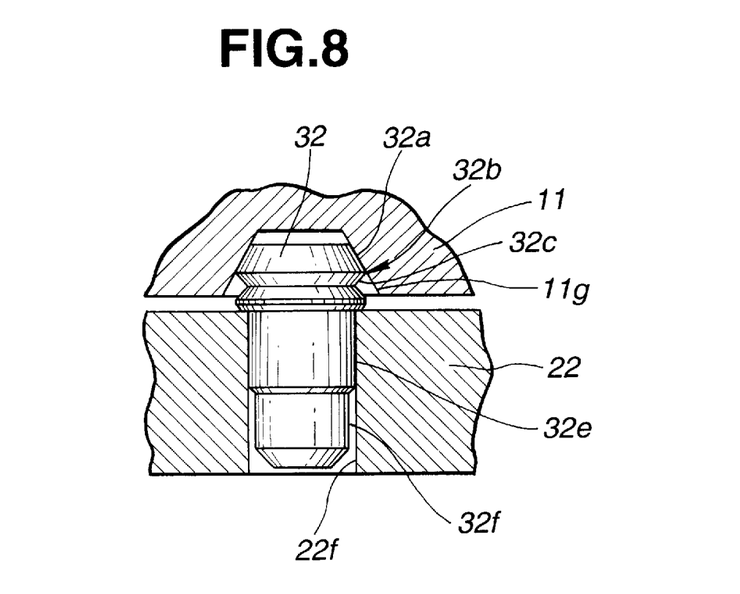
FIG. 8 is a longitudinal sectional view showing the cam follower, which is shown in FIG. 7, mounted in the M-cam frame and second group-of-lenses frame.

FIG. 7 is a front view of each cam follower 32. FIG. 8 is a longitudinal sectional view showing the cam follower 32 fixed to the second group-of-lenses frame 22 and the associated cam groove 11g of the M-cam frame 11 which are engaged with each other.

Each cam follower 32 has a conical slider contact surface 32a, an edge 32b, an escape surface 32c, a seat 32d, a shaft 32e, and an introducing portion 32f. The conical slider contact surface 32a defines a taper angle θ that increases towards the shaft of the cam follower. The edge 32b is a portion of the slider contact surface having the largest diameter, that is, a margin of the slider contact surface located in a direction in which the cam follower is disengaged from the cam groove. The escape surface 32c is a surface of a V-cut groove and defines an escape angle θ2 for creating the edge 32b. The shaft 32e is press-fitted into the shaft hole 22f of the second group-of-lenses frame 22. The cam follower 32 is press-fitted up to the seat 32d thereof. The introducing portion 32f has a diameter a bit smaller than the diameter of the shaft 32e and serves as a guide for press-fitting.

By contrast, the slide inclined surfaces of each cam groove 11g of the M-cam frame 11 are each shaped like a trapezoid in conformity with the slider contact surface 32a of each cam follower 32 defining the taper angle θ1. When the slider contact surface 32a of the cam follower 32 is engaged with the cam groove, the slide inclined surfaces of the cam groove 11g are, as shown in FIG. 8, longer than the length of the contact portion of the slider contact surface 32. The edge 32b lies on the slide inclined surfaces of the cam groove 11g.

The rotation of the M-cam frame 11 or the driving force for advancement or withdrawal exerted thereby is conveyed to the second group-of-lenses frame 22 via the cam followers 32 engaged in the cam grooves 11g. The second group-of-lenses frame 22 is then driven to advance or withdraw. During the driving movement, repulsion stemming from pressure occurs on the junctions between the inclined surfaces of each cam groove 11b of the M-cam frame 11 and the slider contact surface 32a of each cam follower 32.

Due to the repulsion, the M-cam frame 11 and second group-of-lenses frame 22 attempt to deform outward and inward respectively. As mentioned above, as long as the conventional structure having cam grooves and cam followers formed on lens frames is adopted, there arises a fear that the cam grooves and cam followers of the lens frames may be disengaged from each other. However, when the cam grooves 11g and cam followers 32 formed as mentioned above are used in combination, the edge 32b formed below the slider contact surface 32a of each cam follower abuts, as shown in FIG. 8, on the slide inclined surface of each cam groove 11g. The edge 32b acts to sink in the slide inclined surface of the cam groove 11g made of a resin. Owing to the sinking action, the cam groove 11g and the slider contact surface 32a of the cam follower are prevented from parting from each other. Consequently, it is prevented that the slider contact surface is disengaged from the cam groove.

In the group-of-lenses frame unit 50C having the foregoing members, the projections 22b formed on the outer circumference of the second group-of-lenses frame 22 on the side of an object are fitted into the rectilinear grooves 21b of the first group-of-lenses frame so that the second group-of-lenses frame can slide freely. Thus, the first group-of-lenses frame 21 is mounted. Moreover, the guide shafts 24 and 25 of the third group-of-lenses frame are fitted into the shaft hole 22d and notch 22e so that the third group-of-lenses frame can slide freely. The third group-of-lenses frame 23 is thus mounted. A compression spring 26 is wound about the guide shaft 24. The third group-of-lenses frame 23 therefore always undergoes a constraining force oriented towards a film surface.

Furthermore, the movable follower 28 is mounted on the second group-of-lenses frame 22 by fitting the guide shaft 27 into the shaft hole 28a so that the movable follower can slide freely. As long as the third group-of-lenses frame 23 does not undergo an abutment force exerted by the camera body 51, the locking claw 28c of the movable follower 28 is engaged with the locked portion 23b of the third group-of-lenses frame 23. Thus, the third group-of-lenses frame 23 is positioned.

The foregoing group-of-lenses frame unit 50C is placed in the aforesaid M-cam frame 11 and F-cam frame 12 of the group-of-lenses driving system 50B so that the frame unit can advance or withdraw rectilinearly. Moreover, the rectilinear key 13f of the key ring 13 which is guided rectilinearly is engaged with the rectilinear guide hole 22c of the second group-of-lenses frame 22 so that the rectilinear key can slide freely. The first and third group-of-lenses frames 21 and 23 and the movable follower 28 are therefore borne together with the second group-of-lenses frame 22 by the cam frames so that they can advance or withdraw rectilinearly.

The cam followers 31 of the first group-of-lenses frame are engaged in the first group-of-lenses cam groove 12b of the F-cam frame. The cam followers 32 and 33 of the second group-of-lenses frame are engaged with the second group-of-lenses cam grooves 11g of the M-cam frame and the second group-of-lenses cam grooves 12c of the F-cam frame respectively. Moreover, the cam follower 28b of the movable follower is engaged with the third group-of-lenses cam groove 12d of the F-cam frame.

Consequently, a position to which the second group-of-lenses frame 22 is advanced or withdrawn relative to the M-cam frame 11 is determined based on the second group-of-lenses cam grooves 11g of the M-cam frame 11. A position to which the F-cam frame 12 is advanced or withdrawn is determined based on the second group-of-lenses frame 22 and the second group-of-lenses cam grooves 12c of the F-cam frame 12. Moreover, a position to which the movable follower 28 is advanced or withdrawn is determined based on the third group-of-lenses cam groove 12d of the F-cam frame. A position to which the third group-of-lenses frame 23 is advanced or withdrawn is determined according to the locking portion 28c of the movable follower 28.

Next, a description will be made of movements for collapsing or thrusting the lens barrel 50 having the foregoing components.

When the lens barrel 50 is collapsed, all the members including the rotary frame 2 are, as shown in FIG. 3, held in the stationary frame 1 and thus collapsed. At this time, the third group-of-lenses frame 23 and movable flare diaphragm 15 are pressed by a projection 51b formed near an aperture 51a of the camera body 51 and thus stowed. In this state, the distal convex parts 15c of the movable flare diaphragm 15 are in contact with the outer circumferential surface 11a of the M-cam frame 11, and moving forward.

For driving the lens barrel 50 from the collapsed state to a ready-to-photograph state, the helicoid driving gear 7 is rotated in a direction B1. This causes the helicoid ring 4 to rotate in a direction C1. Due to the rotation, the rotary frame 2 and movable frame 5 are moved unitedly in a direction D1 while being guided by the rectilinear grooves 1b. The lens barrel 50 is thrust from the collapsed position to the ready-to-photograph position (See the upper half of FIG. 4). In this state, the movable frame 5 remains engaged with the rectilinear grooves 1d and 1b. The rotary frame 2 has the projections 2c disengaged from the rectilinear grooves 1b and fitted in the concave parts 3c of the driving ring 3. The rotary frame 2 can now be rotated owing to the driving ring 3.

The driving ring 3 is rotated from the ready-to-photograph state by a little angle in a direction E0 by means of a zooming driving system. Consequently, the lens barrel 50 enters a wide-angle state shown in the upper half of FIG. 4.

Moreover, the first group-of-lenses frame 21 and second group-of-lenses frame 22 are thrust together with the rotary frame 2 and movable frame 5 in the course of being driven from the collapsed state to the ready-to-photograph state and wide-angle state. The third group-of-lenses frame 23 is separated relatively backward from the M-cam frame 11 and second group-of-lenses frame 22 due to the constraining force exerted by the compression spring 26. The third group-of-lenses frame 23 thus relatively withdraws to a wide-angle position or a position at which the locking claw 28c of the movable follower 28 is engaged with the locked portion 23b of the third group-of-lenses frame 23.

Meanwhile, the movable flare diaphragm 15 is pressed against the M-cam frame 11 by the third group-of-lenses frame 23 that is withdrawing. The movable flare diaphragm 15 then withdraws relatively. At this time, the distal convex parts 15c of the arms 15b reach the end outer circumferential surface 11a' of the M-cam frame 11. When the M-cam frame 11 is rotated a bit to the wide-angle position in the direction E0, the distal convex parts 15c slides down over the inclined surface 11d and reaches the stepped circumferential surface 11c. In this state, the movable flare diaphragm 15 is located at a predetermined position relative to the M-cam frame 11, and functions as a normal flare diaphragm.

For driving the lens barrel 50 from the wide-angle state to a telephoto state, the driving ring 3 is driven to rotate in the direction E0. This causes the rotary frame 2 to rotate in the same direction (See the lower part of FIG. 4). The M-cam frame 11 rotates along with the rotation in the direction E0 of the rotary frame 2. The lens barrel 50 is thrust along the cam grooves 5h of the movable frame 5. Moreover, the F-cam frame 12 is also rotated together with the M-cam frame 11 owing to the rectilinear grooves 11f. A position to which the lens barrel 50 is thrust is determined according to the cam followers 33 of the second group-of-lenses frame 22 engaged with the cam grooves 12c.

The second group-of-lenses frame 22 that is rectilinearly guided by the key ring 13 is thrust to a telephoto position owing to the second group-of-lenses cam grooves 11g of the M-cam frame 11 with which the cam followers 32 are engaged. Moreover, the first group-of-lenses frame 21 is thrust to the telephoto position owing to the first group-of-lenses cam grooves 12b of the F-cam frame 12 with which the cam followers 31 are engaged. Furthermore, the movable follower 28 of the third group-of-lenses frame 23 is positioned based on the third group-of-lenses cam groove 12d of the F-cam frame 12. The third group-of-lenses frame 23 is positioned at the telephoto position by the locking claw 28b of the movable follower 28.

Moreover, while the M-cam frame 11 is driven to rotate and advance or withdraw so as to change from the wide-angle state to the telephoto state, the movable flare diaphragm 15 is not rotated but held intact owing to the concave parts 13e of the key ring 13. The movable flare diaphragm 15 slides over the stepped circumferential surface 11c with the distal convex parts 15c thereof sandwiched between the stepped lateral surface 11b and the side surfaces of the concave parts 13e of the key ring 13. Consequently, the movable flare diaphragm 15 is reliably retained at a position separated by a predetermined distance from the M-cam frame 11, and functions as a normal flare diaphragm.

For driving the lens barrel 50 from the wide-angle state through the ready-to-photograph state to the collapsed state, the driving ring 3 is rotated in a direction E1 in order to bring the lens barrel 50 temporarily to the ready-to-photograph state. In this state, the first group-of-lenses frame 21 and second group-of-lenses frame 22 stay in the movable frame 5. The third group-of-lenses frame 23 is withdrawn relatively to the M-cam frame 11 (See the upper half of FIG. 4). Moreover, the distal convex parts 15c of the arms of the movable flare diaphragm 15 slide from the stepped circumferential surface 11c over the inclined surface 11d because the M-cam frame 11 rotates in the direction E1. Consequently, the distal convex parts 15c lie on the end outer circumferential surface 11a'.

Thereafter, the helicoid driving gear 7 is driven to rotate in a direction B0. This causes the helicoid ring 4 to rotate in a direction C0. Consequently, the rotary frame 2 withdraws in a direction D0 together with the movable frame 5. The projections 2c of the rotary frame 2 are disengaged from the driving ring 3. When the helicoid ring 4 is further rotated, the rotary frame 2 is moved in the direction D0 together with the movable frame 5 and plunged into the collapsed position and stowed in the stationary frame 1 (See FIG. 3).

Owing to the above collapse movement, the third group-of-lenses frame 23 and movable flare diaphragm 15 are pressed against the projection 51b of the camera body 51, and advanced relatively against the constraining force exerted by the compression spring 26. The third group-of-lenses frame 23 is stowed in the second group-of-lenses frame 22 (See FIG. 3). The movable flare diaphragm 15 advances in the direction of the optical axis relative to the M-cam frame 11. The distal convex parts 15c of the arms of the movable flare diaphragm 15 slide forward from the end outer circumferential surface 11a' of the M-cam frame 11 over the outer circumferential surface 11a. The lens barrel is thus stowed (See FIG. 3).

In the aforesaid lens barrel 50 of the embodiment, the cam followers 17 to be press-fitted into the shaft holes 11h of the M-cam frame 11 have the edges 17b formed as part of the shafts 17a thereof. When each cam follower is press-fitted into the shaft hole or tilted, the edge 17b of the cam follower sinks into the shaft hole 11h. Therefore, even when the M-cam frame 11 is thin, a force oriented in a direction along the optical axis O or a perpendicular direction may act on the shaft 17a due to the slider contact surface 17a or any other cam follower 18. Nevertheless, the shaft 17b can be prevented from coming out. The frame members can be reliably driven to advance or withdraw.

Furthermore, in the lens barrel 50 of the present embodiment, a driving mechanism composed of cam grooves and cam followers is adopted as a structure for driving the M-cam frame 11 and second group-of-lenses frame 22 to rotate and advance or withdraw them. According to the driving mechanism, the edge 32b is, as shown in FIG. 8, formed as the margin of the slider contact surface 32a of each cam follower 32 which has the largest diameter. The edge 32 is abutted on the slide inclined surfaces of the cam groove 11g.

While the M-cam frame 11 and second group-of-lenses frame 22 are rotating and advancing or withdrawing, a pressing force may act on the junction between any cam groove 11g and any slider contact surface 32a. Consequently, the M-cam frame 11 or second group-of-lenses frame 22 may deform or may attempt to deform. At this time, the edge 32b acts to sink into the slide inclined surfaces of the cam groove 11g of the M-cam frame 11.

Therefore, even when the M-cam frame 11 or the second group-of-lenses frame 22 is thin, the cam groove 11g and cam follower 32 are reliably prevented from disengaging from each other owing to the sinking action. Moreover, the second group-of-lenses frame 22 is driven to advance or withdraw successfully.

Figure 9:
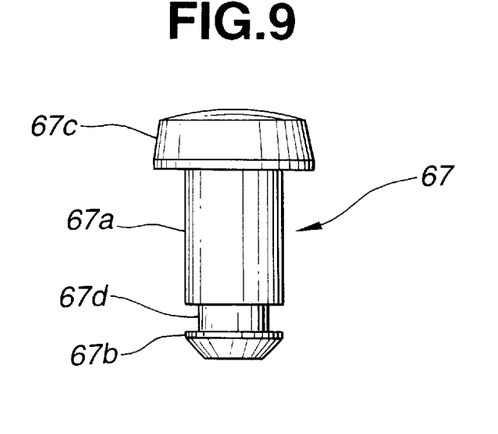
FIG. 9 is a front view showing a variant of the cam follower shown in FIG. 5.

Now, a description will be made of a cam follower 67 having a slider contact surface 67c, which is shown in the front view of FIG. 9, as a variant of the cam follower 17 shown in FIG. 5. The cam follower 67 has a shaft 67a whose edge is different from the edge 17b of the shaft, which is press-fitted, of the cam follower 17 shown in FIG. 5. An escape portion 67d having a predetermined width is formed in the shaft 67a, and an edge 67b is formed to define the same diameter as the shaft 67a.

When the cam follower 67 of the variant is adopted, the same advantage as that provided by the cam follower 17 of the aforesaid embodiment can be exerted.

Figure 10:
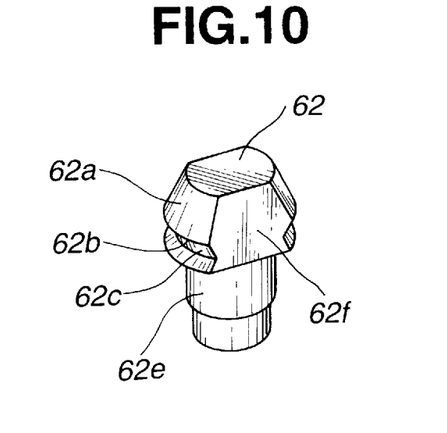
FIG. 10 is an oblique view showing a variant of the cam follower shown in FIG. 7.

Next, a description will be made of a cam follower 62 shown in the oblique view of FIG. 10 as a variant of the cam follower 32 shown in FIG. 7. The cam follower 62 has a slider contact surface 62a thereof formed as part of a conical surface, and has a side surface thereof formed as a cut surface 62f. This is a difference. Moreover, similarly to the cam follower 32, the cam follower 62 has an edge 62b, an escape surface 62c, and a press-fitting shaft 62d. The cam follower 62 provides the same advantage as the cam follower 32.

Figure 11:
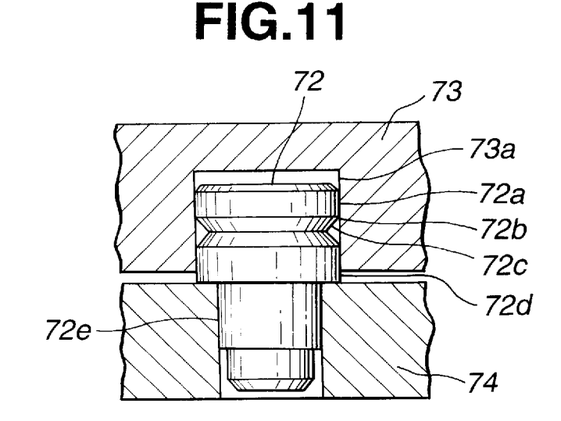
FIG. 11 is a longitudinal sectional view showing another variant of the cam follower, which is shown in FIG. 7, being engaged.

Furthermore, a cam follower 72 and a cam groove 73a shown in FIG. 11 may be proposed as another variant of the cam follower 32 and cam groove 11g shown in FIG. 7. The cam follower 72 has slider contact surfaces 72a and 72d, an edge 72b, and a shaft 72e. The slider contact surfaces 72a and 72d are cylindrical surfaces. The edge 72b is created due to the presence of a V-cut portion 72c formed between the slider contact surfaces 72a and 72d. The shaft 72e is press-fitted into a lens frame 74. Moreover, the cam groove 73a is a parallel groove bored in the lens frame 73. The side surfaces of the parallel groove extend parallel to each other. When the cam follower 72 is engaged with the cam groove 73a, the edge 72b of the cam follower 72 comes in contact with the slide surfaces of the cam groove 73a.

Even in this variant, while the lens frames are driven to rotate and advance or withdraw, the edge 72b of the cam follower 72 acts to sink into the slide surfaces of the cam groove 73a. Even if the lens frames 73 and 74 may deform or may attempt to deform, the cam follower 72 will be prevented from coming off due to the sinking. Consequently, the lens frames can be driven to advance or withdraw successfully.

Preferably, the slider surface 72d should define a smaller outer diameter than the slider surface 72a. In this case, the sinking effect will further improve.

Figure 12:
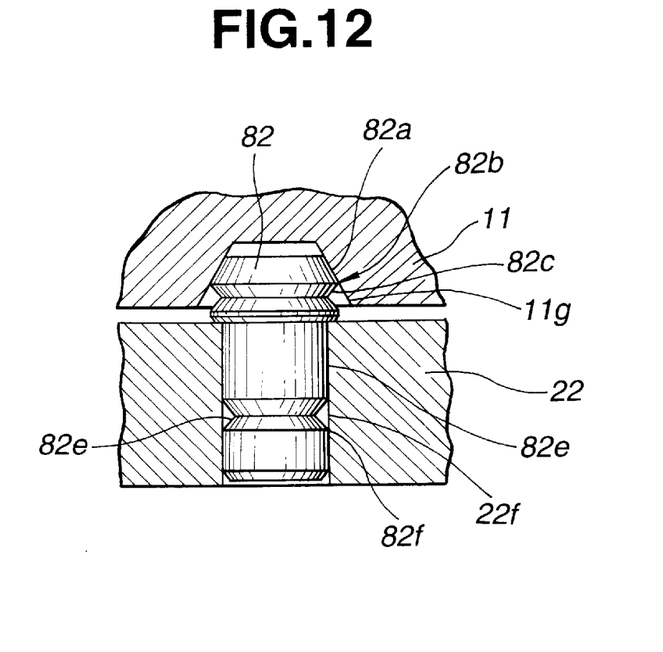
FIG. 12 is a longitudinal sectional view showing yet another variant of the cam follower, which is shown in FIG. 7, being engaged.

Furthermore, a cam follower 82 shown in FIG. 12 may be proposed as another variant of the cam follower 32 shown in FIG. 7. The shape of the cam follower 82 is the same as that of the cam follower 32 in terms of a slider surface 82a, an edge 82b, and an escape surface 82c. A difference lies in that a V groove 82e and an edge 82f are formed in the distal portion of a shaft 82e to be press-fitted into the second group-of-lenses frame 22.

When the cam follower 82 is adopted, the slider surface 82a will hardly come off from the cam groove 11g of the M-cam frame 11. Moreover, the shaft 82e will hardly come out of the second group-of-lenses frame 22. Consequently, the lens barrel can be moved smoothly. Moreover, the lens barrel need not be designed to have large dimensions. This results in a compact lens barrel.

Figure 13:
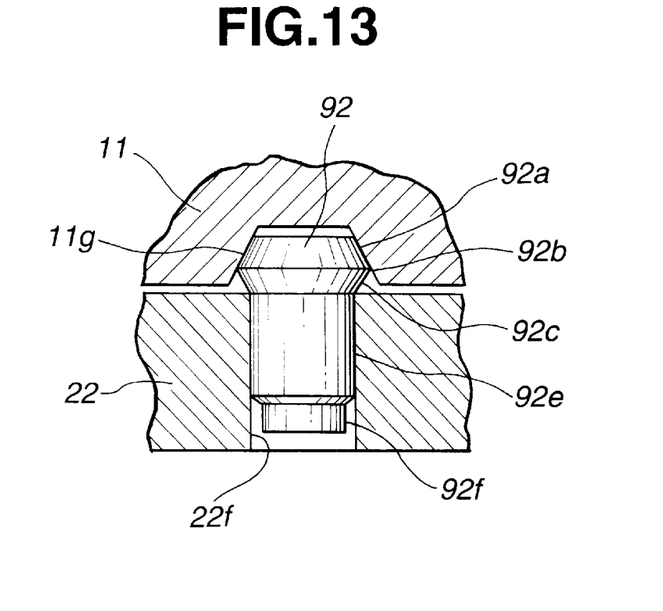
FIG. 13 is a longitudinal sectional view showing still another variant of the cam follower, which is shown in FIG. 7, being engaged.

Moreover, a cam follower 92 shown in FIG. 13 may be proposed as still another variant of the cam follower 32 shown in FIG. 7. The shape of the cam follower 92 is the same as that of the cam follower 32 in terms of a slider surface 92a, an edge 92b, a shaft 92e, and an introducing portion 92f. Differences lie in that an escape surface 92c adjoining the edge is not a V-cut groove and a seat is not formed below the edge.

When the cam follower 92 is adopted, since no surface is formed below the slider surface 92a, each cam groove 11g of the M-cam frame 11 can be made shallower. This leads to a more compact lens barrel.

What is claimed is:

1. A lens barrel, comprising:
   a first frame having a cam groove; and
   a second frame to be moved relative to said first frame;
   wherein a cam follower having:
      an axis,
      a slider surface, which slides in contact with the cam surface of said cam groove,
      an escape surface that is oblique to the axis and escapes amid the cam surface, said slider surface and said escape surface defining a circumferential edge,
   is fixed to said second frame.

2. A lens barrel according to claim 1, wherein said cam groove is rectilinear.

3. A lens barrel according to claim 2, wherein said cam groove has a trapezoidal sectional shape.

4. A lens barrel according to claim 2, wherein said cam groove has a rectangular sectional shape.

5. A lens barrel according to claim 3, wherein said cam follower has a conical shape and has a circumferential groove formed in the conical surface.

6. A lens barrel according to claim 4, wherein said cam follower has a cylindrical shape and has a circumferential groove formed in the cylindrical surface.

7. A lens barrel according to claim 5, wherein the conical portion of said cam follower having the largest diameter slides in contact with the slide surfaces of said cam groove having the trapezoidal sectional shape.

8. A lens barrel according to claim 5, wherein said circumferential groove is a V-shaped groove.

9. A lens barrel according to claim 6, wherein said circumferential groove is a V-shaped groove.

10. A lens barrel, comprising:
    a frame member having a cam groove;
    a cam follower formed with a shaft-like member and sliding on said cam groove,
    wherein said cam follower has two surfaces that are oblique to the shaft-like member, defining an edge formed as any portion thereof other than the end surface thereof so that the edge will come into contact with the cam surface of said cam groove generally at a mid-point thereof.

11. A lens barrel according to claim 10, wherein said cam groove has a trapezoidal sectional shape.

12. A lens barrel according to claim 10, wherein said cam groove has a rectangular sectional shape.

13. A lens barrel according to claim 11, wherein said cam follower has a conical shape and has a circumferential groove formed in the conical surface.

14. A lens barrel according to claim 10, wherein said cam follower has a cylindrical shape and has a circumferential groove formed in the cylindrical surface.

15. A lens barrel according to claim 13, wherein the conical portion of said cam follower having the largest diameter slides in contact with the slide surfaces of said cam groove having the trapezoidal sectional shape.

16. A lens barrel according to claim 13, wherein said circumferential groove is a V-shaped groove.

17. A lens barrel according to claim 14, wherein said circumferential groove is a V-shaped groove.

18. A lens barrel according to claim 10, wherein said cam groove is rectilinear.

19. A lens barrel, comprising:
    one frame member having a cam;
    the other frame member to be moved relative to said one frame member; and a cam follower having a shaft with which the cam follower is fitted in the other frame member and a slider contact surface that slides on said cam, wherein an edge is formed on the circumference of said shaft by surfaces that are oblique to said shaft, and said shaft is press-fitted into a hole bored in the other frame member;

wherein one of said surfaces escapes amid the cam.

20. A lens barrel according to claim 19, wherein said circumferential edge of said cam follower is realized with a ridge of a V-shaped circumferential groove formed in said shaft.

21. A lens barrel according to claim 19, wherein said circumferential edge of said cam follower is realized with a ridge of a circumferential groove that has a rectangular cross section and is formed in said shaft.

22. A lens barrel according to claim 19, wherein said cam follower has a conical distal portion, and the conical portion having the largest diameter is fitted into a hole bored in said the other frame member.

23. A lens barrel according to claim 19, wherein said cam is rectilinear.

24. A lens barrel, comprising:

a first frame having a cam groove;

a second frame to be moved relative to said first frame; and a cam follower having:

an axis, a slider surface that slides in contact with the cam surface of said cam groove, and an escape surface that is oblique to the axis and escapes amid the cam surface, said slider surface and said escape surface defining a circumferential edge, said cam follower having a shaft with a circumferential surface that has a circumferential edge;

wherein said cam follower has said shaft thereof fitted into a hole bored in said second frame.

25. A lens barrel according to claim 24, wherein said cam groove is rectilinear.

26. A lens barrel, comprising:

one frame member having a rectilinear cam;

the other frame member to be moved relative to said one frame member; and a cam follower having a shaft with which the cam follower is fitted in the other frame member and the slider contact surface that slides on said cam, wherein an edge is formed on the circumference of said shaft by surfaces that are oblique to said shaft, and said shaft is press-fitted into a hole bored in the other frame member.

27. A lens barrel, comprising:

a frame member having a cam groove; and a cam follower formed with a shaft-like member and having a slider contact portion that slides on said cam groove, wherein said slider contact portion has a circumferential groove defined by a surface adjacent to said slider contact portion that is oblique to said shaft-like member;

wherein the surface escapes amid the cam surface.

28. A lens barrel according to claim 27, wherein said cam groove is rectilinear.

29. A lens barrel, comprising:

a frame member stowed in said lens barrel; and a cam follower having a shaft to be fitted in said frame member and a slider engagement portion that slides on and engages with a cam, wherein an edge is formed by surfaces oblique to said shaft in any portion of the circumferential surface of said shaft other than the end surface of said shaft;

wherein one of said surfaces escapes amid the cam.

30. A lens barrel according to claim 29, wherein said cam is rectilinear.

31. A lens barrel, comprising:

a frame member stowed in said lens barrel; and a cam follower having a shaft to be fitted in said frame member and a slider engagement portion that slides on and engages with a cam, wherein a circumferential groove is formed in the circumferential surface of said shaft with a surface adjacent to the circumferential surface that is oblique to said shaft;

wherein the surface escapes amid the cam.

32. A lens barrel according to claim 31, wherein said cam is rectilinear.

33. A lens barrel, comprising:

a frame member stowed in said lens barrel; and a cam follower having a shaft to be fitted in said frame member and a slider engagement portion that slides on and engages with a rectilinear cam, wherein an edge is formed by surfaces oblique to said shaft in any portion of the circumferential surface of said shaft other than the end surface of said shaft.

34. A lens barrel, comprising:

a frame member stowed in said lens barrel; and a cam follower having a shaft to be fitted in said frame member and a slider engagement portion that slides on and engages with a rectilinear cam, wherein a circumferential groove is formed in the circumferential surface of said shaft with a surface adjacent to the circumferential surface that is oblique to said shaft.

* * * * *